(12) United States Patent
Hinderliter (10) Patent No.: US 11,795,878 B2
(45) Date of Patent: Oct. 24, 2023

(54) HIGH-TEMPERATURE FUEL THERMAL TRANSPORT BUS ARCHITECTURE

(71) Applicant: General Electric Company, Schenectady, NY (US)

(72) Inventor: Kevin Edward Hinderliter, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 17/165,541

(22) Filed: Feb. 2, 2021

(65) Prior Publication Data
US 2022/0243659 A1 Aug. 4, 2022

(51) Int. Cl.
*F02C 7/224* (2006.01)
*F02C 7/14* (2006.01)
*F02C 7/18* (2006.01)

(52) U.S. Cl.
CPC ............... *F02C 7/224* (2013.01); *F02C 7/14* (2013.01); *F02C 7/185* (2013.01); *F05D 2260/205* (2013.01); *F05D 2260/213* (2013.01)

(58) Field of Classification Search
CPC ............ F02C 7/224; F02C 7/14; F02C 7/185
See application file for complete search history.

(56) References Cited

U.S. PATENT DOCUMENTS

| | | | |
|---|---|---|---|
| 4,696,156 A * | 9/1987 | Burr ...................... | B64D 37/34 60/39.08 |
| 6,939,392 B2 | 9/2005 | Huang et al. | |
| 7,260,926 B2 | 8/2007 | Sabatino et al. | |
| 8,261,527 B1 | 9/2012 | Stearns et al. | |
| 9,687,773 B2 | 6/2017 | Johnson et al. | |
| 9,789,972 B2 | 10/2017 | Smith et al. | |
| 9,834,315 B2 | 12/2017 | Lo et al. | |
| 10,017,032 B2 | 7/2018 | Behrens et al. | |
| 10,215,097 B2 | 2/2019 | Miller et al. | |
| 2008/0053101 A1 * | 3/2008 | Schwarz ................ | B64D 33/02 60/772 |
| 2011/0203291 A1 * | 8/2011 | Erickson .................. | F02C 9/28 60/776 |
| 2012/0096869 A1 * | 4/2012 | Kesseli .................... | F02C 3/20 60/39.461 |
| 2012/0312037 A1 * | 12/2012 | Finney ................... | B64D 37/34 62/115 |
| 2014/0140829 A1 * | 5/2014 | Blair ....................... | F28D 15/00 415/177 |

(Continued)

*Primary Examiner* — Gerald L Sung
*Assistant Examiner* — Alyson Joan Harrington
(74) *Attorney, Agent, or Firm* — Dority & Manning, P.A.

(57) ABSTRACT

A gas turbine engine assembly includes a gas turbine engine with a combustion section, a fuel delivery system, and a thermal energy management system. The fuel delivery assembly provides a fuel to the combustion section of the gas turbine engine. The thermal energy management system includes a thermal transport bus, a heat source heat exchanger, and a heat sink heat exchanger. The thermal transport bus has a portion of the fuel configured to flow therethrough. The fuel is disposed as a heat exchange fluid of the thermal energy management system. The heat source heat exchanger is in thermal communication with the flow of fuel through the transport bus. The heat sink heat exchanger is in thermal communication with the flow of fuel through the transport bus.

11 Claims, 3 Drawing Sheets

(56) References Cited

U.S. PATENT DOCUMENTS

| | | | |
|---|---|---|---|
| 2014/0196463 A1* | 7/2014 | Zielinski | F02C 7/236 |
| | | | 60/734 |
| 2017/0058779 A1 | 3/2017 | Harvey et al. | |
| 2018/0038280 A1 | 2/2018 | Rogero et al. | |
| 2019/0153952 A1* | 5/2019 | Niergarth | F02C 3/20 |
| | | | 60/39.461 |
| 2020/0140111 A1* | 5/2020 | O'Connor | F02M 37/22 |
| 2020/0140112 A1 | 5/2020 | O'Connor et al. | |

* cited by examiner

FIG. 3 ent embodiments of the disclosure and/or appeared. In one exemplary embodiment of the present disclosure,

HIGH-TEMPERATURE FUEL THERMAL TRANSPORT BUS ARCHITECTURE

FIELD

In general, the present disclosure relates to management of thermal energy in an engine. In particular, the present disclosure relates to a thermal transport bus in a gas turbine engine.

BACKGROUND

A gas turbine engine generally includes a turbomachine and a rotor assembly. Gas turbine engines, such as turbofan engines, are used for aircraft propulsion. In the case of a turbofan engine, the rotor assembly can be configured as a fan assembly.

Various accessory systems are included to ensure that the fan and/or core operate as desired. For example, a main lubrication system provides lubrication to, e.g., bearings and gear meshes within a compressor section, a turbine section, and a power gear box (if provided). In addition to the lubricating properties provided to such components, the main lubrication system can be used to remove heat from such components such that they operate within a desired temperature range.

Other accessory systems of the gas turbine engine, such as an environmental control system, also require heat removal during operation. Accordingly, gas turbine engines typically include numerous heat exchangers, each heat exchanger dedicated to an individual accessory system of the gas turbine engine.

In existing thermal energy management systems, thermal transport buses are used to manage the transfer of thermal energy among various heat exchangers. However, heat exchange mediums used by existing thermal transport buses can add increased fluid volume to the engine. In other instances, existing heat exchange fluids can include relatively low pressure and temperature thresholds preventing those mediums from performing at higher temperatures and pressures that may be required by the engine.

SUMMARY

Aspects and advantages of the disclosure will be set forth in part in the following description, or may be obvious from the description, or may be learned through practice of the disclosure.

In one exemplary embodiment of the present disclosure, a gas turbine engine assembly includes a gas turbine engine with a combustion section, a fuel delivery system, and a thermal energy management system. The fuel delivery assembly provides a fuel to the combustion section of the gas turbine engine. The thermal energy management system includes a thermal transport bus, a heat source heat exchanger, and a heat sink heat exchanger. The thermal transport bus has a portion of the fuel configured to flow therethrough. The fuel is disposed as a heat exchange fluid of the thermal energy management system. The heat source heat exchanger is in thermal communication with the flow of fuel through the transport bus. The heat sink heat exchanger is in thermal communication with the flow of fuel through the transport bus.

In one exemplary embodiment of the present disclosure, a thermal energy management system for a gas turbine engine assembly includes a thermal transport bus, a heat source heat exchanger, and a fuel-to-fuel heat exchanger. The thermal transport bus is configured to have a portion of fuel flow through the thermal transport bus as a heat exchange fluid of the thermal energy management system. The heat source heat exchanger is in thermal communication with the flow of fuel through the transport bus. The fuel-to-fuel heat exchanger is configured to thermally connect a flow of fuel through the thermal transport bus to a flow of fuel through the fuel delivery assembly of the gas turbine engine.

In one exemplary embodiment of the present disclosure, a gas turbine engine includes a fan section, a compressor section, a combustion section, a turbine section, an exhaust section, a fuel delivery system, and a thermal management system. The fan section, the compressor section, the combustion section, the turbine section, and the exhaust section are arranged in serial flow order and together define a core air flowpath. The fuel delivery system provides a flow of fuel to the combustion section. The thermal management system includes a first heat exchanger, a second heat exchanger, a third heat exchanger, a first heat sink exchanger, and a thermal transport bus. The first heat exchanger is positioned to be in thermal communication with a flow through the core air flowpath within or downstream of the turbine section, the exhaust section, or both. The second heat exchanger is in thermal communication with the fuel delivery system for transferring heat to the flow of fuel provided to the combustion section. The third heat exchanger is connected to and is in fluid communication with the thermal transport bus at a location upstream from the first heat exchanger. The first heat sink is connected to and is in fluid communication with the thermal transport bus at a location downstream from the second heat exchanger. The thermal transport bus has a heat exchange fluid flowing through the thermal transport bus. The first heat exchanger, the second heat exchanger, the third heat exchanger, and the first heat sink are each fluidly coupled to the thermal transport bus. The heat exchange fluid comprises deoxygenated fuel such that combustion of the deoxygenated fuel provides a driving force of the gas turbine engine.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling description of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The disclosure presented herein describes a thermal transport bus architecture that utilizes the combustible fuel of the engine as the heat exchange medium (e.g., fluid). Deoxygenated fuel is recirculated through the thermal transport bus in a loop that is pressurized and continually charged by a reference pressure set by the fuel system of the engine's propulsion system. Utilization of fuel as the heat exchange fluid eliminates the need for additional working fluids such as supercritical carbon dioxide. Additionally, certain embodiments of the disclosed fuel based thermal transport bus and associated assembly include a pressure-controlled recirculation circuit within the engine fuel system that provides a reference pressure thereby eliminating the need for a discrete accumulator or reservoir to accommodate expansion, contraction, and/or charging of the system.

Additionally, the disclosed thermal management system allows for leak isolation along the thermal transport bus. For example, in the event of a leak associated with one of the heat exchangers on the thermal transport bus circuit, the isolated thermal transport bus circuit also allows for leak detection and isolation, potentially eliminating the need of an inflight shutdown. The proposed thermal management system also discloses a bus control system that enables purging and priming of the thermal transport bus. The bus control system includes commissioning valves disposed to control a recirculation of fuel into and out of the thermal transport bus and to purge air out of the thermal transport bus. This purging and priming functionality allows all the necessary surfaces of the heat exchangers along the thermal transport bus to be properly wetted to provide the desired performance, to prevent excess air from entering into the system, and to purge air from the system.

Figure 1:
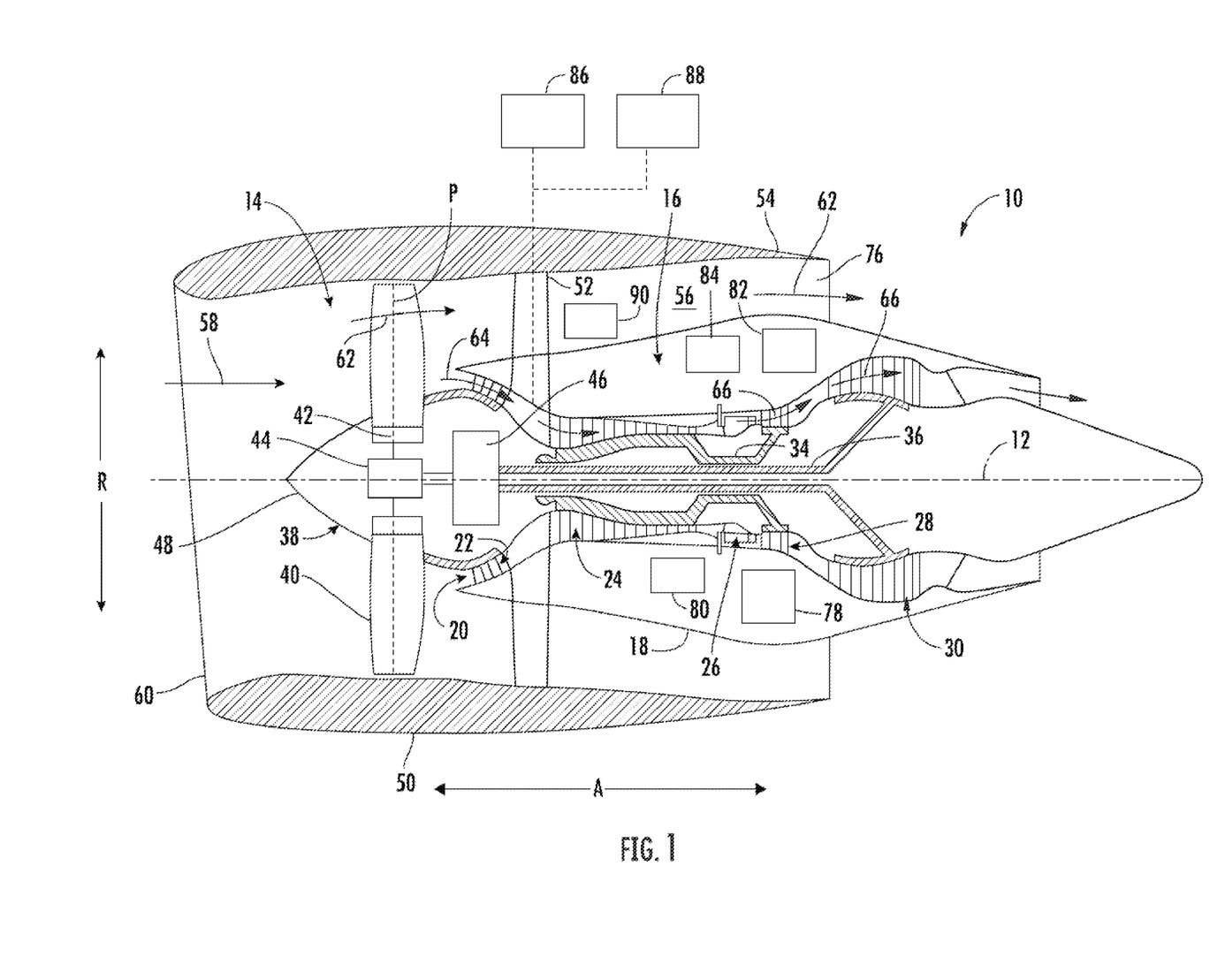
FIG. 1 is a cross-sectional view of a gas turbine engine in accordance with an exemplary aspect of the present disclosure.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, turbofan engine 10 defines an axial direction A (extending parallel to longitudinal centerline 12 provided for reference) and a radial direction R. In general, turbofan engine 10 includes fan section 14 and core turbine engine 16 disposed downstream from fan section 14.

The exemplary core turbine engine 16 depicted generally includes a substantially tubular outer casing 18 that defines annular inlet 20. Outer casing 18 encases, in serial flow relationship, a compressor section including a booster or low pressure (LP) compressor 22 and high pressure (HP) compressor 24; combustion section 26; a turbine section including high pressure (HP) turbine 28 and low pressure (LP) turbine 30; and combustion section 26. High pressure (HP) shaft or spool 34 drivingly connects HP turbine 28 to HP compressor 24. Low pressure (LP) shaft or spool 36 drivingly connects LP turbine 30 to LP compressor 22.

For the embodiment depicted, fan section 14 includes variable pitch fan 38 having a plurality of fan blades 40 coupled to disk 42 in a spaced apart manner. As depicted, fan blades 40 extend outwardly from disk 42 generally along radial direction R. Each fan blade 40 is rotatable relative to disk 42 about pitch axis P by virtue of fan blades 40 being operatively coupled to a suitable actuation member 44 configured to collectively vary the pitch of fan blades 40 in unison. Fan blades 40, disk 42, and actuation member 44 are together rotatable about longitudinal axis 12 by LP shaft 36 across power gear box 46. Power gear box 46 includes a plurality of gears for stepping down the rotational speed of LP shaft 36 to a more efficient rotational fan speed.

Referring still to the exemplary embodiment of FIG. 1, disk 42 is covered by rotatable front hub 48 aerodynamically contoured to promote an airflow through the plurality of fan blades 40. Additionally, fan section 14 includes an annular fan casing or outer nacelle 50 that circumferentially surrounds fan 38 and/or at least a portion of core turbine engine 16. It should be appreciated that in some embodiments, nacelle 50 can be configured to be supported relative to core turbine engine 16 by a plurality of circumferentially spaced outlet guide vanes 52. Moreover, downstream section 54 of nacelle 50 can extend over an outer portion of core turbine engine 16 so as to define bypass airflow passage 56 therebetween.

During operation of turbofan engine 10, a volume of air 58 enters turbofan engine 10 through an associated inlet 60 of nacelle 50 and/or fan section 14. As the volume of air 58 passes across fan blades 40, a first portion of air 58 as indicated by arrows 62 is directed or routed into bypass airflow passage 56 and a second portion of air 58 as indicated by arrow 64 is directed or routed into LP compressor 22. The ratio between first portion of air 62 and second portion of air 64 is commonly known as a bypass ratio. The pressure of second portion of air 64 is then increased as it is routed through high pressure (HP) compressor 24 and into combustion section 26, where it is mixed with fuel and burned to provide combustion gases 66. Subsequently, combustion gases 66 are routed through HP turbine 28 and LP turbine 30, where a portion of thermal and/or kinetic energy from combustion gases 66 is extracted.

Combustion gases 66 are then routed through combustion section 26 of core turbine engine 16 to provide propulsive thrust. Simultaneously, the pressure of first portion of air 62 is substantially increased as first portion of air 62 is routed through bypass airflow passage 56 before it is exhausted from fan nozzle exhaust section 76 of turbofan engine 10, also providing propulsive thrust.

Moreover, as is depicted schematically, turbofan engine 10 further includes various accessory systems to aid in the operation of turbofan engine 10 and/or an aircraft including turbofan engine 10. For example, turbofan engine 10 further includes main lubrication system 78 configured to provide a lubricant to, e.g., various bearings and gear meshes in the compressor section (including LP compressor 22 and HP compressor 24), the turbine section (including HP turbine 28 and LP turbine 30), HP spool 34, LP spool 36, and power gear box 46. The lubricant provided by main lubrication system 78 increases the useful life of such components and removes a certain amount of heat from such components. Additionally, turbofan engine 10 includes compressor cooling air ("CCA") system 80 for providing air from one or both of HP compressor 24 or LP compressor 22 to one or both of HP turbine 28 or LP turbine 30. Moreover, turbofan engine 10 includes active thermal clearance control ("ACC") system 82 for cooling a casing of the turbine section to maintain a clearance between the various turbine rotor blades and the turbine casing within a desired range throughout various engine operating conditions. Furthermore, turbofan engine 10 includes generator lubrication system 84 for providing lubrication to an electronic generator. In one example, the electronic generator provides electrical power to a startup electric motor for turbofan engine 10, various other electronic components of turbofan engine 10, and/or an aircraft including turbofan engine 10.

As is also depicted schematically, turbofan engine 10 drives or enables various other accessory systems for an aircraft including turbofan engine 10. For example, turbofan engine 10 provides compressed air from the compressor section to environmental control system ("ECS") 86. In one example, ECS 86 provides an air supply to a cabin of the aircraft for pressurization and thermal control. Air can be provided from turbofan engine 10 to electronics cooling system 88 for maintaining a temperature of certain electronic components of turbofan engine 10 and/or the aircraft within a desired range. Additionally, surface cooler 90 can be included in fan section 14. In this example, surface cooler 90 is a heat sink exchanger. Surface cooler 90 is disposed along a surface (e.g., annular fan casing or outer nacelle 50 that circumferentially surrounds fan 38) of fan section 14. In this example, surface cooler 90 is exposed to (e.g., in thermal communication with) first portion of air 62 flowing through turbofan engine 10. Surface cooler 90 functions by transferring thermal energy from surface cooler 90 into first portion of air 62 either directly via conduction (and/or convection) or indirectly via a sidewall of fan section 14. As will be discussed further with respect to FIG. 2, surface cooler 90 is connected to a thermal management system (e.g., see thermal management system 100 in FIG. 2).

It should be appreciated, however, that turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, turbofan engine 10 may instead be any other suitable aeronautical gas turbine engine, such as a turbojet engine, turboshaft engine, turboprop engine, etc. Additionally, in still other exemplary embodiments, turbofan engine 10 may include or be operably connected to any other suitable accessory systems. Additionally, or alternatively, turbofan engine 10 may not include or be operably connected to one or more of the accessory systems discussed above.

Figure 2:
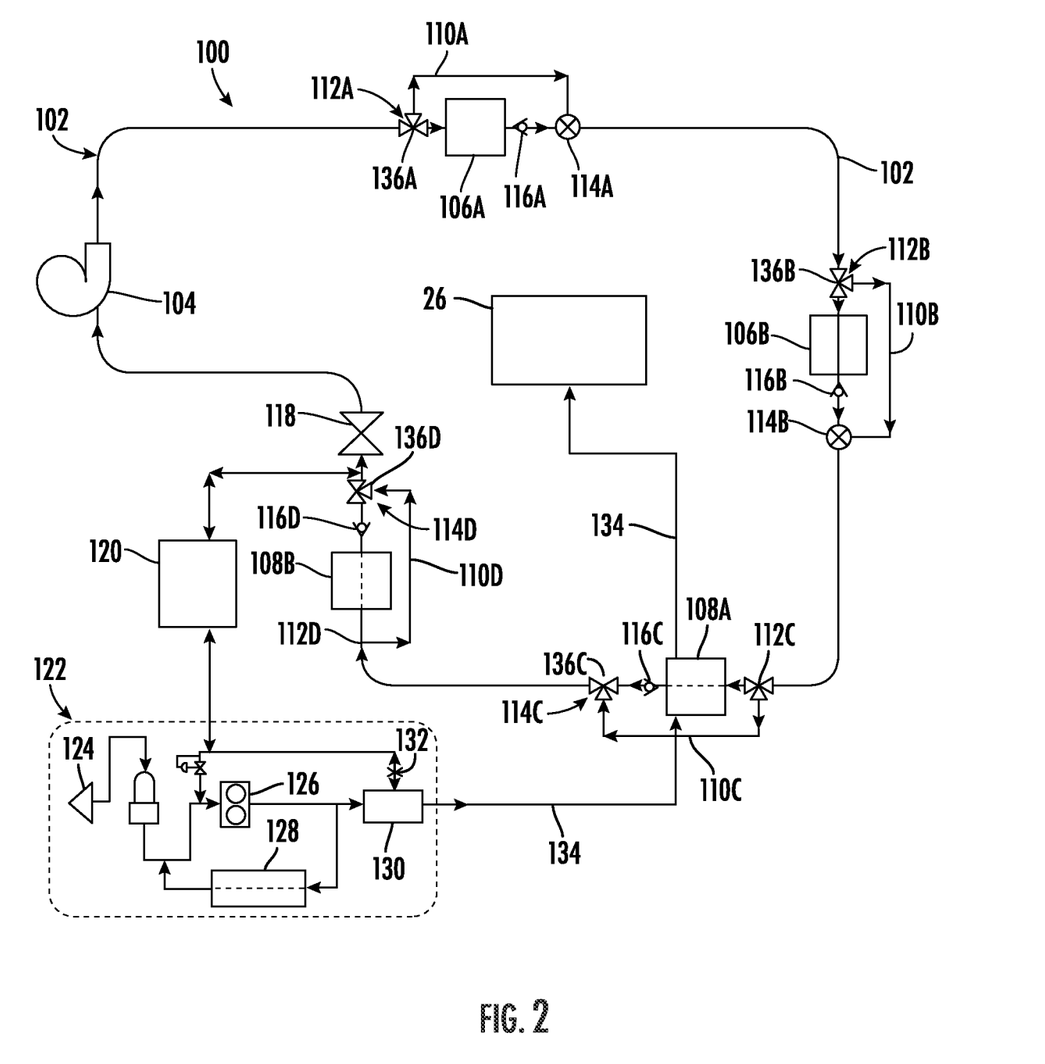
FIG. 2 is a simplified schematic view of a first thermal management system in accordance with an exemplary embodiment of the present disclosure.

FIG. 2 is a simplified schematic view of a thermal management system 100 and shows a thermal transport bus 102, a pump 104, heat source exchangers 106 (including a first heat source exchanger 106A and a second heat source exchanger 106B), heat sink exchangers 108 (including a first heat sink exchanger 108A and a second heat sink exchanger 108B), bypass lines 110 (including a first bypass line 110A, a second bypass line 110B, a third bypass line 110C, and a fourth bypass line 110D), upstream junctures 112A-112D, downstream junctures 114A-114D, check valves 116A-116D, flow control valve 118, leak isolation system 120, fuel delivery assembly 122 (including BP 124, MFP 126, fuel metering unit 130, and restriction 132), and fuel delivery line 134. A simplified schematic representation of combustion section 26 of turbofan engine 10 is also shown in FIG. 2.

As shown, thermal management system 100 is a thermal energy management system and generally includes thermal transport bus 102. Thermal transport bus 102 includes an intermediary heat exchange fluid flowing therethrough and may be formed of one or more suitable fluid conduits. In this example, the heat exchange fluid is the fuel of the aircraft. For example, the heat exchange fluid can be a deoxygenated fuel whereby combustion of the deoxygenated fuel provides a driving force of turbofan engine 10 via combustion section 26. In certain exemplary embodiments, the deoxygenated fuel may have an oxygen content of less than or equal to about 5 parts per million down to 1 part per million.

The thermal management system 100 further includes pump 104 in fluid communication with the heat exchange fluid in thermal transport bus 102 for generating a flow of the heat exchange fluid in and/or through thermal transport bus 102. As viewed in FIG. 2, pump 104 generates a flow of the heat exchange fluid through thermal transport bus 102. In one example, pump 104 can be a centrifugal pump, a rotary pump including an impeller, or alternatively may be any other suitable fluid pump. In one example, pump 104 may be mechanically coupled to and/or driven by an accessory gearbox of turbofan engine 10. In another example, pump 104 can be powered by an electric motor, or alternatively can be in mechanical communication with and powered by HP shaft 34 or LP shaft 36 of turbofan engine 10.

Thermal management system 100 also includes a plurality of heat source exchangers 106 (including first heat source exchanger 106A and second heat source exchanger 106B) that are each in thermal communication with the heat exchange fluid in thermal transport bus 102. Each of the plurality of heat source exchangers 106 are configured to transfer or absorb thermal energy to or from one or more of the accessory systems of turbofan engine 10 (or in operable communication with turbofan engine 10) to the heat exchange fluid in thermal transport bus 102.

For example, first heat source exchanger 106A can be configured as an "air to heat exchange fluid" heat exchanger integrated into one or both of turbofan engine 10 or an aircraft including turbofan engine 10. During operation, first heat source exchanger 106A transfers thermal energy to a portion of the heat exchange fluid in thermal transport bus 102 by flowing a certain amount of air (e.g., engine bleed air or ECS bleed air) over first heat source exchanger 106A. In one example, first heat source exchanger 106A can be a bus cooled air cooler that transfers heat from an airflow, such as an airflow bled from HP compressor 24, to the fuel flowing through thermal transport bus 102. From there, the cooled air can then be used for cooling (e.g., for cooling HP turbine 28).

Likewise, second heat source exchanger 106B can generally be an "air to heat exchange fluid" heat exchanger which flows air (e.g., waste heat airflow) over the heat exchange fluid to transfer thermal energy to the heat exchange fluid. In one example, second heat source exchanger 106B can be a waste heat recovery heat exchanger that excepts thermal energy (e.g., from the exhaust of turbofan engine 10) and provides the thermal energy to the fuel flowing through thermal transport bus 102.

In one example, first heat sink exchanger 108A can be configured as a "fluid to heat exchange fluid" heat sink wherein thermal energy from the heat exchange fluid in thermal transport bus 102 is transferred to a stream of liquid fuel for turbofan engine 10. In particular, first heat sink exchanger 108A is configured as a "fuel to fuel" heat sink wherein thermal energy from the fuel in thermal transport bus 102 is transferred to a stream of fuel flowing through fuel delivery line 134 thereby increasing a temperature of the fuel to be combusted (e.g., by combustion section 26).

In other exemplary embodiments, the plurality of heat source exchangers 106 may include two or more of: a main lubrication system heat exchanger for transferring heat from main lubrication system 78; a CCA system heat source exchanger for transferring heat from the CCA system 80; an ACC system heat source exchanger for transferring heat from ACC system 82; a generator lubrication system heat source exchanger for transferring heat from generator lubrication system 84; an ECS heat exchanger for transferring heat from ECS 86; and an electronics cooling system heat exchanger for transferring heat from electronics cooling system 88. Accordingly, thermal management system 100 in accordance with an exemplary embodiment of FIG. 2 transfers thermal energy from a variety of independent systems to the heat exchange fluid in thermal transport bus 102 for removal.

For the embodiment depicted, there are two heat source exchangers 106 (e.g., first heat source exchanger 106A and second heat source exchanger 106B), with each of heat source exchangers 106 arranged in a series flow arrangement along thermal transport bus 102. In other examples, a different number of heat source exchangers 106 can be included and one or more of the heat source exchangers 106 can be arranged in parallel flow along thermal transport bus 102. For example, in other embodiments, there may be one heat source exchanger 106 in thermal communication with the heat exchange fluid in thermal transport bus 102, or alternatively, there may be at least three heat source exchangers 106, at least four heat source exchangers 106, or at least five heat source exchangers 106 in thermal communication with heat exchange fluid in thermal transport bus 102.

Thermal management system 100 of FIG. 2 further includes first heat sink exchanger 108A and second heat sink exchanger 108B permanently or selectively in thermal communication with the heat exchange fluid in thermal transport bus 102. First heat sink exchanger is located downstream of the plurality of heat source exchangers 106. Second heat sink exchanger 108B is located downstream of first heat sink exchanger 108A and is configured for transferring heat from the heat exchange fluid in thermal transport bus 102, e.g., to atmosphere, to fuel, to a fan stream, etc. In this example, second heat sink exchanger 108B is the same component as surface cooler 90 (e.g., a fan air surface cooler that is exposed to air flowing through fan section 14) shown in FIG. 1.

Heat exchangers 106A-106B and heat sink exchangers 108A-108B are depicted as being selectively in thermal communication with the heat exchange fluid in thermal transport bus 102. More particularly, thermal management system 100 includes bypass lines 110A, 110B, 110C, and 110D for selectively bypassing each of first heat source exchanger 106A, second heat source exchanger 106B, first heat sink exchanger 108A, and second heat sink exchanger 108B, respectively. In one example, bypass lines 110A, 110B, 110C, and 110D can be used to isolate the volumes of first heat source exchanger 106A, second heat source exchanger 106B, first heat sink exchanger 108A, and second heat sink exchanger 108B. In this case, with the now isolated volumes of first heat source exchanger 106A, second heat source exchanger 106B, first heat sink exchanger 108A, and second heat sink exchanger 108B, leak identification may be achieved by monitoring a pressure of the fixed volume of any of first heat source exchanger 106A, second heat source exchanger 106B, first heat sink exchanger 108A, and second heat sink exchanger 108B.

Each of bypass lines 110 extend between a respective upstream juncture 112 and a respective downstream juncture 114. For example, upstream juncture 112 located just upstream of a respective heat source exchanger 106 or heat sink exchanger 108, and downstream juncture 114 located just downstream of the respective heat source exchanger 106 or heat sink exchanger 108. Each of bypass lines 110A and 110B meets at the respective upstream juncture 112A and 112B with thermal transport bus 102 via three-way valves 136A and 136B, respectively. Each of bypass lines 110C and 110D meets at the respective downstream juncture 114A and 114B with thermal transport bus 102 via three-way valves 136C and 136D, respectively.

For example, three-way valve 136A includes an inlet fluidly connected with thermal transport bus 102, a first outlet fluidly connected with a portion of thermal transport bus 102 extending to heat source first heat source exchanger 106A, and a second outlet fluidly connected with bypass line 110A, and likewise for three-way valve 136B. For three-way valve 136C, an outlet of three-way valve 136DC is fluidly connected with thermal transport bus 102, a first inlet is fluidly connected with a portion of thermal transport bus 102 extending from first heat sink exchanger 108A, and a second inlet fluidly connected with bypass line 110C, and likewise for three-way valve 136D.

In this example, three-way valves 136A-136D ("three way valves 136") can each be a variable throughput three-way valve, such that three-way valves 136 may vary a throughput from the inlet to the first and/or second outlets. For example, three-way valves 136 can be configured for providing anywhere from zero percent (0%) to one hundred percent (100%) of the heat exchange fluid from the inlet to the first outlet, and similarly, three-way valves 136 may be configured for providing anywhere from zero percent (0%) to one hundred percent (100%) of the heat exchange fluid from the inlet to the second outlet.

Further, each of bypass lines 110A-110D also meets with or joins to thermal transport bus 102 at a respective one of downstream junctures 114A-114D. Between each of heat source exchanger 106 or heat sink exchanger 108 and downstream juncture 114, thermal transport bus 102 includes a check valve 116 (see e.g., check valves 116A-116D) for ensuring a proper flow direction of the heat exchange fluid. More particularly, each of check valves 116 prevents a flow of heat exchange fluid from downstream juncture 114 towards the respective heat source exchanger 106 or heat sink exchanger 108.

Leak isolation system 120 is a system for detecting and isolating fuel leaks of thermal management system 100. Fuel delivery system 122 includes BP 124, main fuel pump 126, actuation 128, fuel metering unit 130, and restriction 132. BP 124 is a boost pump for providing an initial pressurization of fuel prior to the gear stage. Main fuel pump 126 is a pump for pressuring and distributing fuel to and from fuel delivery system 122. Actuation 128 is a component configured for using high pressure fuel as a motive fluid for moving variable geometry components, such as one or more variable geometry components of the engine (e.g., guide vanes). Fuel metering unit 130 is a device for regulating or metering the flow of fluid therethrough. In this example, fuel metering unit 130 regulates a flow of fuel passing therethrough. Restriction 132 is a fixed sized or variable orifice for constricting or slowing a flow of fuel passing therethrough.

In this example, fuel delivery system 122 functions by controlling and providing a pressurized flow of fuel to and from leak isolation system 120 and first heat sink exchanger 108A. In one example, fuel delivery system 122 can be referred to as a pressure maintenance system. Fuel delivery line 134 is a pipe or conduit configured to transport a fluid (e.g., fuel) therethrough. Fuel delivery line 134 is fluidly connected to fuel metering unit 130 of fuel delivery system 122, extends to and passes through first heat sink exchanger 108A, and continues on to fluidly connect to combustion section 26 of turbofan engine 10. Three-way valves 136A-136D (collectively referred to as three-way valves 136) are each a variable throughput three-way valve, such that each of three-way valves 136 may vary a throughput from the inlet to the first and/or second outlets.

With fuel being used as the heat exchange fluid flowing through thermal transport bus 102, the need for other more exotic fluids (e.g., supercritical carbon dioxide) to be used as the heat exchanger fluid is eliminated. This reduction or elimination of additional sources of fluid coolant minimizes an amount of fuel volume of the engine fuel system thereby reducing the thermal and pressure loads on thermal management system 100 and on turbofan engine 10. In this way, thermal management system 100 removes heat from the various accessory systems of turbofan engine 10 and/or the aircraft more efficiently than existing thermal management systems that do not utilize fuel as the thermal exchange fluid.

Additionally, fuel delivery system 122 functions to provide a reference pressure for maintaining and/or controlling a pressure of the heat exchange fluid (e.g., fuel) flowing through thermal transport bus 102. Fuel is recirculated through thermal transport bus 102 in a loop that is pressurized and continually charged by the reference pressure set by fuel delivery system 122. In this way, thermal management system 100 does not need to include a distinct reservoir or accumulator component in order to accommodate expansion, contraction, and charging of components of thermal management system 100. In one example, fuel from fuel metering unit 130 effectively acts as an accumulator or reservoir to control the pressure of the circuit in thermal management system 100. As thermal transport bus 102 gets warmer (e.g., gains thermal energy), a small amount of fuel is going to migrate from thermal transport bus 102 into fuel delivery assembly 122. Conversely, as thermal transport bus 102 gets cooler (e.g., loses thermal energy), a small amount of fuel is going to migrate from fuel delivery assembly 122 into thermal transport bus 102.

Figure 3:
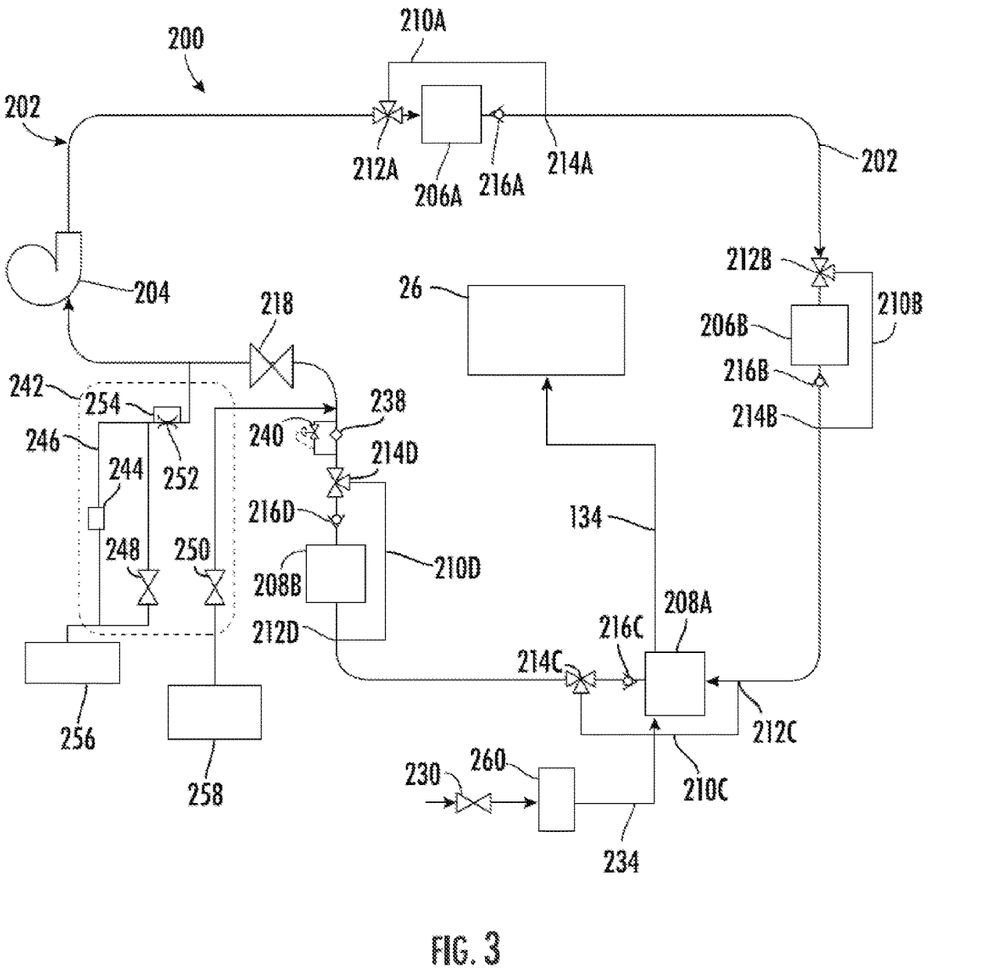
FIG. 3 is a simplified schematic view of a second thermal management system in accordance with an exemplary embodiment of the present disclosure.

It should be appreciated, however, that thermal management system 100 is provided by way of example only, and that in other exemplary embodiments, thermal management system 100 may be configured in any other suitable manner (see e.g., thermal management system 200 in FIG. 3).

FIG. 3 is a simplified schematic view of thermal management system 200 and shows thermal transport bus 202, pump 204, heat source exchangers 206 (including first heat source exchanger 206A and second heat source exchanger 206B), heat sink exchangers 208 (including first heat sink exchanger 208A and second heat sink exchanger 208B), bypass lines 210 (including first bypass line 210A, second bypass line 210B, this bypass line 210C, and fourth bypass line 210D), upstream junctures 212A-212D, downstream junctures 214A-214D, flow control valve 218, fuel metering unit 230, fuel delivery line 234, filter 238, pressure relief valve 240, bus control assembly 242 (with excess flow valve 244, charge line 246, first commissioning valve 248, second commissioning valve 250, control valve 252, and bypass line 254), ejector outlet pressure source 256, engine boost suction source 258, and flow split valve 260. A simplified schematic representation of combustion section 26 of turbofan engine 10 is also shown in FIG. 3. To note, FIG. 3 includes components that are the same or similar components to those shown and discussed with respect to FIG. 2. Here in FIG. 3, components corresponding to the same or similar components from FIG. 2 are assigned a character reference numeral that is 100 greater than the corresponding character reference numeral assigned for FIG. 2. For example, thermal management system 200 shown in FIG. 3 corresponds to thermal management system 100 shown in FIG. 1, and so on and so forth. It is to be understood that the elements of FIG. 3 corresponding to the same or similar elements in FIG. 2 are configured in substantially the same manner as the corresponding components shown in and described with respect to FIG. 2.

Filter 238 is an element for removing specific particulates or air from the liquid fuel passing through filter 238. Pressure relief valve 240 is a valve for releasing or decreasing a pressure of the fluid in the fluid circuit that pressure relief valve 240 is in fluid communication with. Bus control assembly 242 is a system for controlling the pressurization and commissioning of thermal transport bus 202 and includes excess flow valve 244, charge line 246, first commissioning valve 248, second commissioning valve 250, control valve 252, and bypass line 254. In one example, bus control assembly 242 can be referred to as a pressure maintenance system. Excess flow valve 244 is a valve for controlling a flow of fluid by closing when a large change in pressure in the fluid occurs. Charge line 246 and bypass line 254 are pipes or conduits for the transport of a fluid (e.g., fuel). First commissioning valve 248, second commissioning valve 250, and control valve 252 are valves for controlling a flow of fluid therethrough. In one example, control valve 252 can be a calibrated orifice or flow meter. Ejector outlet pressure source 256 is a source of fuel from a fuel ejector outlet of turbofan engine 10. Engine boost suction source 258 utilizes fuel to provide a boost for turbofan engine 10. Flow split valve 260 is a valve that divides a fluid flow into two or more parts.

Filter 238 is fluidly connected to thermal transport bus 202 on a portion of thermal transport bus 202 extending between second heat sink exchanger 208B and flow control valve 218. Pressure relief valve 240 is fluidly connected to a line or conduit that bypasses filter 238. Bus control assembly 242 fluidly connects to thermal transport bus 202 at a point between filter 238 and flow control valve 218 and at a point between flow control valve 218 and pump 204. Excess flow valve 244 is fluidly connected to charge line 246 and is arranged in a parallel flow relationship with first commissioning valve 248. Excess flow valve 244 is disposed on charge line 246 between ejector outlet pressure source 256 and control valve 252. Charge line 246 is fluidly connected to and extends between ejector outlet pressure source 256 and a point along thermal transport bus 202 located between flow control valve 218 and pump 204.

First commissioning valve 248 is positioned between and is fluidly connected to ejector outlet pressure source 256 and control valve 252. Second commissioning valve 250 is positioned between and in fluid communication with engine boost suction source 258 and a point along thermal transport bus 202 between filter 238 and flow control valve 218. Control valve 252 is fluidly connected to and disposed on charge line 246 between excess flow valve 244 and a point along thermal transport bus between flow control valve 218 and pump 204. Bypass line 254 is fluidly connected to charge line 246 and extends across or bypasses control valve 252. Ejector outlet pressure source 256 is fluidly connected to thermal transport bus 202 via charge line 246. Engine boost suction source 258 is fluidly connected to thermal transport bus 202 at a point along thermal transport bus 202 between filter 238 and flow control valve 218. Flow split valve 260 is fluidly connected to flow metering unit 230 and to heat source exchanger 206C. Flow split valve 260 is disposed downstream from flow metering unit 230 and upstream from heat source exchanger 206C.

Filter 238 removes particulates from a flow of fuel passing through thermal transport bus 202 at filter 238. Pressure relief valve 240 controls an amount and pressure of fuel passing across filter 238. Bus control assembly 242 controls an amount and pressure of fuel into and out of thermal transport bus 202.

Excess flow valve 244 includes a diaphragm that is attached to an orifice such that the diaphragm will not move in response to small amounts of equalization flow or pressure equalization between thermal transport bus 202 and the reference pressure set by bus control assembly 242. In response to large and/or sudden amounts of equalization flow or pressure equalization between thermal transport bus 202 and the reference pressure set by bus control assembly 242, excess flow valve 244 shuts preventing flow of fuel across excess flow valve 244. In one example, excess flow valve 244 provides a means for leak detection of thermal transport bus 202. In the event that one of heat source exchangers 206 or heat sink exchangers 208 suffers a leak (e.g., due to a crack or catastrophic failure), a sudden or unexplained drop in pressure in thermal transport bus 202 would occur due to an amount of fuel leaking out of thermal transport bus 202. In such an instance of a leak and there is a sustained amount of fuel flow to thermal transport bus 202 and the pressure drops, excess flow valve 244 will be closed shut thereby isolating the leak in thermal management system 200 from the rest of the fuel system of turbofan engine 10.

Charge line 246 delivers or transports fuel from ejector outlet pressure source 256, through bus control assembly 242, and to thermal transport bus 202. First commissioning valve 248 and second commissioning valve 250 are configured to control at least one of a purging and a priming of the thermal transport bus. For example, both of first commissioning valve 248 and second commissioning valve 250 are configured to occupy one of a first closed position and a second open position. When first commissioning valve 248 and/or second commissioning valve 250 occupies the first closed position, a flow of fuel or air into and out of thermal transport bus 202 is prevented by the first commissioning valve 248 and/or second commissioning valve 250. Likewise, when first commissioning valve 248 and second commissioning valve 250 occupies the second open position, a flow of fuel or air into and out of thermal transport bus 202 is enabled.

In one example, thermal transport bus 202 can be either purged or primed (of air and/or fuel) by opening first and second commissioning valves 248 and 250. For example, with first and second commissioning valves 248 and 250 occupying an open position, fuel would be allowed to circulate through thermal transport bus 202 to ensure all surfaces within heat source exchangers 206 and heat sink exchangers 208 are wetted. In another example, with first and second commissioning valves 248 and 250 occupying an open position, air can be purged from thermal transport bus 202 to prevent excess air in thermal transport bus 202.

Control valve 252 controls an amount of fuel being delivered from bus control assembly 242 to thermal transport bus 202. In one example, control valve is used to detect a scenario where an excess flow valve fails to close during a leak. In this way, control valve 252 acts as a backup to the leak detection system or leak mitigation system (e.g., excess flow valve 244). When utilized, bypass line 254 delivers an amount of fuel around or past control valve 252. Ejector outlet pressure source 256 supplies a pressurized fuel source to thermal transport bus 202 via bus control assembly 242. Engine boost suction source 258 receives fuel from thermal transport bus 202 via bus control assembly 242.

In one example, changes in an amount of fuel in charge line 246 are monitored relative to a predetermined baseline amount of fuel for charge line 246. Charge line 246 ensures the pressure at pump 204 is at a minimum level or a sufficient level of fuel. In one example, pressurizing a suction of pump 204 can satisfy a minimum positive suction head requirement of pump 204 to prevent cavitation. In another example, an excess amount of fuel in charge line 246 can be detected if a sudden or unexplained drop in volume and/or pressure in thermal transport bus 202 caused by a broken pipe or a significant failure of one of heat source exchangers 206 or heat sink exchangers 208. Once the excess amount of fuel is detected in charge line 246, the leak can be isolated from the rest of thermal management system 200 by closing excess flow valve 244. In this example, excess flow valve 244 is disposed to selectively allow a flow of fuel from ejector outlet pressure source 256 to thermal transport bus 202.

Here, because thermal management system 200 with fuel based thermal transport bus 202 includes leak isolation capability, an operator (e.g., pilot) would not need to shut down turbofan engine 10 during mid-use (e.g., mid-flight) if a leak were to occur thereby allowing continuous and safe use of turbofan engine 10.

Benefits of the embodiments disclosed herein can include at least an improved fuel burn and thrust for turbofan engine 10, leak identification and isolation of leaks occurring in heat source exchangers 106/206 and heat sink elements 108/208 along thermal transport buses 102/202, the minimization of overall engine fuel system volume, and the utilization of compressor cooling air and waste heat recovery heat exchangers in thermal management systems 100/200.

This written description uses examples to describe aspects of the disclosure, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine assembly includes a gas turbine engine with a combustion section, a fuel delivery system, and a thermal energy management system. The fuel delivery assembly provides a fuel to the combustion section of the gas turbine engine. The thermal energy management system includes a thermal transport bus, a heat source heat exchanger, and a heat sink heat exchanger. The thermal transport bus has a portion of the fuel configured to flow therethrough. The fuel is disposed as a heat exchange fluid of the thermal energy management system. The heat source heat exchanger is in thermal communication with the flow of fuel through the transport bus. The heat sink heat exchanger is in thermal communication with the flow of fuel through the transport bus.

The gas turbine engine assembly of one or more of these clauses further comprising a pressure maintenance system, wherein the pressure maintenance system fluidly couples the fuel delivery assembly with the thermal transport bus, wherein the pressure maintenance system is configured to pressurize and charge the portion of the fuel that is in the thermal transport bus.

The gas turbine engine assembly of one or more of these clauses wherein the heat source heat exchanger comprises a bus cooled air cooler heat exchanger in thermal communication with the flow of fuel through the thermal transport bus, wherein the bus cooled air cooler heat exchanger is disposed along the thermal transport bus and upstream from the heat sink heat exchanger, and a waste heat recovery heat exchanger in thermal communication with the flow of fuel through the thermal transport bus, wherein the waste heat recovery heat exchanger is disposed along the thermal transport bus, upstream from the heat sink heat exchanger and downstream from the bus cooled air cooler heat exchanger.

The gas turbine engine assembly of one or more of these clauses wherein the thermal transport bus further comprises a plurality of bypass lines for selectively bypassing any one of the heat sink heat exchanger, the bus cooled air cooler heat exchanger, and the waste heat recovery heat exchanger.

The gas turbine engine assembly of one or more of these clauses wherein the plurality of bypass lines comprises: a first bypass line with an upstream end and a downstream end, wherein the upstream end of the first bypass line is connected to the thermal transport bus at a location upstream of the bus cooled air cooler heat exchanger, wherein the downstream end of the first bypass line is connected to the thermal transport bus at a location downstream of the bus cooled air cooler heat exchanger, wherein the first bypass line is configured to deliver a first portion of the fuel from upstream of the bus cooled air cooler heat exchanger to downstream of the bus cooled air cooler heat exchanger; a second bypass line with an upstream end and a downstream end, wherein the upstream end of the second bypass line is connected to the thermal transport bus at a location upstream of the heat source heat exchanger, wherein the downstream end of the second bypass line is connected to the thermal transport bus at a location downstream of the heat source heat exchanger, wherein the second bypass line is configured to deliver a second portion of the fuel from upstream of the heat source heat exchanger to downstream of the heat source heat exchanger; and a third bypass line with an upstream end and a downstream end, wherein the upstream end of the third bypass line is connected to the thermal transport bus at a location upstream of the fuel-to-fuel heat exchanger, wherein the downstream end of the third bypass line is connected to the thermal transport bus at a location downstream of the fuel-to-fuel heat exchanger, wherein the third bypass line is configured to deliver a third portion of the fuel from upstream of the fuel-to-fuel heat exchanger to downstream of the fuel-to-fuel heat exchanger.

The gas turbine engine assembly of one or more of these clauses further comprising: a heat sink exchanger in thermal communication with the flow of fuel through the transport bus, wherein the heat sink heat exchanger is disposed along the thermal transport bus as a location that is downstream of the heat sink heat exchanger.

The gas turbine engine assembly of one or more of these clauses wherein the heat sink exchanger is a surface cooler disposed along a surface of a fan section of the gas turbine engine.

The gas turbine engine assembly of one or more of these clauses wherein the pump is disposed along the thermal transport bus and downstream of the heat sink exchanger.

The gas turbine engine assembly of one or more of these clauses wherein the heat sink exchanger, the heat sink heat exchange, the bus cooled air cooler heat exchanger, and the waste heat recovery heat exchanger are arranged in a series flow arrangement along the thermal transport bus.

The gas turbine engine assembly of one or more of these clauses wherein the fuel delivery assembly further comprises a commissioning valve configured to control at least one of a purging and a priming of the thermal transport bus.

The gas turbine engine assembly of one or more of these clauses wherein the commissioning valve is configured to occupy one of a first closed position and a second open position; wherein when the commissioning valve occupies the first closed position, a flow of fuel or air into and out of the thermal transport bus is prevented by the commissioning valve; and wherein when the commissioning valve occupies the second open position, a purging of air out of the thermal bus or a priming of the thermal transport bus with fuel is enabled.

The gas turbine engine assembly of one or more of these clauses wherein the pump comprises a centrifugal pump configured to mechanically couple to and be driven by an accessory gear box of the gas turbine engine.

The gas turbine engine assembly of one or more of these clauses wherein the thermal transport bus is configured to isolate the portion of the fuel in the thermal transport bus from a portion of the fuel that is located downstream from the fuel metering unit of the fuel delivery assembly.

The gas turbine engine assembly of one or more of these clauses wherein the fuel delivery assembly further comprises a fuel metering unit, and a fuel delivery line providing a flow of fuel from the fuel metering unit to the combustion section of the gas turbine engine, wherein combustion of the fuel provides a driving force of the gas turbine engine.

The gas turbine engine assembly of one or more of these clauses wherein the thermal energy management system further comprises a pump fluidly connected to the thermal transport bus, wherein the pump is configured to generate a flow of the portion of the fuel in the thermal transport bus.

The gas turbine engine assembly of one or more of these clauses wherein the heat sink exchanger thermally connects the flow of fuel through the thermal transport bus to a flow of fuel through the fuel delivery line.

The gas turbine engine of one or more of these clauses, or the gas turbine engine assembly of one or more of these clauses, further comprising a pressure-controlled recirculation circuit within the engine fuel system that provides a reference pressure, and the gas turbine engine assembly is devoid of a discrete accumulator or reservoir to accommodate expansion, contraction, and/or charging of the thermal energy management system.

A thermal energy management system for a gas turbine engine assembly includes a thermal transport bus, a heat source heat exchanger, and a fuel-to-fuel heat exchanger. The thermal transport bus is configured to have a portion of fuel flow through the thermal transport bus as a heat exchange fluid of the thermal energy management system. The heat source heat exchanger is in thermal communication with the flow of fuel through the transport bus. The fuel-to-fuel heat exchanger is configured to thermally connect a flow of fuel through the thermal transport bus to a flow of fuel through the fuel delivery assembly of the gas turbine engine.

The thermal energy management system of one or more of these clauses further comprising a pump fluidly connected to the thermal transport bus, wherein the pump is configured to generate a flow of the portion of the fuel in the thermal transport bus.

A gas turbine engine includes a fan section, a compressor section, a combustion section, a turbine section, an exhaust section, a fuel delivery system, and a thermal management system. The fan section, the compressor section, the combustion section, the turbine section, and the exhaust section are arranged in serial flow order and together define a core air flowpath. The fuel delivery system provides a flow of fuel to the combustion section. The thermal management system includes a first heat exchanger, a second heat exchanger, a third heat exchanger, a first heat sink exchanger, and a thermal transport bus. The first heat exchanger is positioned to be in thermal communication with a flow through the core air flowpath within or downstream of the turbine section, the exhaust section, or both. The second heat exchanger is in thermal communication with the fuel delivery system for transferring heat to the flow of fuel provided to the combustion section. The third heat exchanger is connected to and is in fluid communication with the thermal transport bus at a location upstream from the first heat exchanger. The first heat sink is connected to and is in fluid communication with the thermal transport bus at a location downstream from the second heat exchanger. The thermal transport bus has a heat exchange fluid flowing through the thermal transport bus. The first heat exchanger, the second heat exchanger, the third heat exchanger, and the first heat sink are each fluidly coupled to the thermal transport bus. The heat exchange fluid comprises deoxygenated fuel such that combustion of the deoxygenated fuel provides a driving force of the gas turbine engine.

The gas turbine engine of one or more of these clauses further comprising wherein the first heat exchanger is a waste heat recovery heat exchanger, wherein the second heat exchanger is a fuel-to-fuel heat exchanger thermally coupled to the thermal transport bus and is fluidly connected to the fuel delivery system, wherein the third heat exchanger is a bus cooled air cooler heat exchanger that is in fluid communication with the turbine section, and wherein the first heat sink is a surface cooler that is mounted to a surface of the fan section of the gas turbine engine.

I claim:

1. A gas turbine engine assembly comprising:
a gas turbine engine having a combustion section;
a fuel delivery system comprising a fuel flowing into a fuel metering unit, wherein the fuel metering unit is fluidly coupled to the combustion section via a first fuel delivery line, wherein a first portion of the fuel flows to the combustion section via the first fuel delivery line for combustion therein; and
a thermal energy management system, comprising a thermal transport bus formed by one or more fluid conduits arranged in a recirculating loop, a heat source heat exchanger, and a heat sink heat exchanger, wherein the fuel metering unit is fluidly coupled to the one or more fluid conduits of the thermal transport bus via a second fuel delivery line with both the first fuel delivery line and the second fuel delivery line being distinct from the one or more fluid conduits arranged in the recirculating loop, wherein a second portion of the fuel from the fuel delivery system circulates through the thermal transport bus, wherein the heat source heat exchanger and the heat sink heat exchanger are in thermal communication with the second portion of the fuel via the one or more fluid conduits, and wherein the heat sink heat exchanger comprises a fuel-to-fuel heat exchanger in which thermal energy from the second portion of the fuel is transferred to the first portion of the fuel;
wherein the fuel delivery system is configured to pressurize and continuously charge the second portion of the fuel flowing within the thermal transport bus.

2. The gas turbine engine assembly of claim 1, wherein the heat source heat exchanger comprises:
a bus cooled air cooler heat exchanger in thermal communication with the second portion of the fuel circulating through the thermal transport bus, wherein the bus cooled air cooler heat exchanger is disposed along the thermal transport bus and upstream from the heat sink heat exchanger; and
a waste heat recovery heat exchanger in thermal communication with the second portion of the fuel circulating through the thermal transport bus, wherein the waste heat recovery heat exchanger is disposed along the thermal transport bus, upstream from the heat sink heat exchanger and downstream from the bus cooled air cooler heat exchanger.

3. The gas turbine engine assembly of claim 2, wherein the thermal transport bus further comprises a plurality of bypass lines for selectively bypassing the second portion of the fuel circulating within the thermal transport bus from any one of the heat sink heat exchanger, the bus cooled air cooler heat exchanger, and the waste heat recovery heat exchanger.

4. The gas turbine engine assembly of claim 3, wherein the plurality of bypass lines comprises:
- a first bypass line with a first upstream end and a first downstream end, wherein the first upstream end of the first bypass line is connected to the thermal transport bus at a first upstream location upstream of the bus cooled air cooler heat exchanger, wherein the first downstream end of the first bypass line is connected to the thermal transport bus at a first downstream location downstream of the bus cooled air cooler heat exchanger;
- a second bypass line with a second upstream end and a second downstream end, wherein the second upstream end of the second bypass line is connected to the thermal transport bus at a second upstream location upstream of the waste heat recovery heat exchanger, wherein the second downstream end of the second bypass line is connected to the thermal transport bus at a second downstream location downstream of the waste heat recovery heat exchanger; and
- a third bypass line with a third upstream end and a third downstream end, wherein the third upstream end of the third bypass line is connected to the thermal transport bus at a third upstream location upstream of the fuel-to-fuel heat exchanger, wherein the third downstream end of the third bypass line is connected to the thermal transport bus at a third downstream location downstream of the fuel-to-fuel heat exchanger.

5. The gas turbine engine assembly of claim 2, wherein the heat sink heat exchanger comprises the fuel-to-fuel heat exchanger and a second heat sink heat exchanger, wherein the second heat sink heat exchanger is disposed along the thermal transport bus at a location that is downstream of the fuel-to-fuel heat exchanger.

6. The gas turbine engine assembly of claim 5, wherein the second heat sink heat exchanger is a surface cooler disposed along a surface of a fan section of the gas turbine engine.

7. The gas turbine engine assembly of claim 5, wherein the thermal energy management system further comprises a pump fluidly connected to the one or more fluid conduits of the thermal transport bus, wherein the pump is configured to recirculate the second portion of the fuel in the thermal transport bus.

8. The gas turbine engine assembly of claim 5, wherein the fuel-to-fuel heat exchanger, the second heat sink heat exchanger, the bus cooled air cooler heat exchanger, and the waste heat recovery heat exchanger are arranged in a series flow arrangement along the thermal transport bus.

9. The gas turbine engine assembly of claim 1, wherein the thermal energy management system further comprises a pump fluidly connected to the one or more conduits of the thermal transport bus, wherein the pump is configured to recirculate the second portion of the fuel in the thermal transport bus, wherein the pump comprises a centrifugal pump configured to mechanically couple to and be driven by an accessory gear box of the gas turbine engine.

10. The gas turbine engine assembly of claim 1, wherein combustion of the first portion of the fuel delivered from the fuel metering unit to the combustion section through the first fuel delivery line provides a driving force of the gas turbine engine.

11. The gas turbine engine assembly of claim 1, wherein the fuel delivery system is configured to receive some portion of the second portion of the fuel from the thermal transport bus into the second fuel delivery line.

* * * * *